(12) United States Patent
Nomura et al.

(10) Patent No.: US 9,594,243 B2
(45) Date of Patent: Mar. 14, 2017

(54) ELECTROWETTING DEVICE AND ELECTROWETTING DISPLAY (71) Applicant: SEKISUI CHEMICAL CO., LTD., Osaka (JP)

(72) Inventors: Shigeki Nomura, Osaka (JP); Takeshi Wakiya, Osaka (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 0 days.

(21) Appl. No.: 14/769,506

(22) PCT Filed: Jul. 18, 2014

(86) PCT No.: PCT/JP2014/069191
§ 371 (c)(1),
(2) Date: Aug. 21, 2015

(87) PCT Pub. No.: WO2015/025659
PCT Pub. Date: Feb. 26, 2015

(65) Prior Publication Data
US 2016/0004066 A1 Jan. 7, 2016

(30) Foreign Application Priority Data
Aug. 20, 2013 (JP) ................. 2013-170212

(51) Int. Cl.
G02B 26/00 (2006.01)
G02B 26/02 (2006.01)
G09G 3/34 (2006.01)

(52) U.S. Cl.
CPC ........... *G02B 26/005* (2013.01); *G09G 3/348* (2013.01)

(58) Field of Classification Search
CPC ..... G02B 26/005; G02B 26/004; G09G 3/348
(Continued)

(56) References Cited

U.S. PATENT DOCUMENTS

2010/0053717 A1* 3/2010 Takahashi ............ G02B 3/0056
359/228
2011/0051213 A1* 3/2011 Kaifu ................ G02B 13/0015
359/228

FOREIGN PATENT DOCUMENTS

JP 2011-053547 3/2011
JP WO 2011135044 A1 * 11/2011 ........... G02B 26/004
(Continued)

OTHER PUBLICATIONS

International Search Report issued Oct. 21, 2014 in corresponding International Application No. PCT/JP2014/069191.
(Continued)

Primary Examiner — Tuyen Tra
(74) Attorney, Agent, or Firm — Wenderoth, Lind & Ponack, L.L.P.

(57) ABSTRACT

An electrowetting device 1 includes a device body 10, a dielectric layer 14, an electrode, a non-polar liquid 17, and a polar liquid 16. The device body 10 includes a cell C. The dielectric layer 14 is disposed in the cell C. The dielectric layer 14 has a hydrophobic surface. The electrode is configured to polarize the dielectric layer 14. The non-polar liquid 17 is disposed on the hydrophobic surface in the cell C. The polar liquid 16 is non-miscible with the non-polar liquid 17. The polar liquid 16 is disposed on the hydrophobic surface in the cell C. The non-polar liquid 17 contains a colored material. The polar liquid 16 contains non-ionic molecules. The non-ionic molecule has a polar portion and a non-polar portion.

15 Claims, 2 Drawing Sheets (58) Field of Classification Search
USPC ..... 359/290, 291, 226.3, 228, 665, 571–573
See application file for complete search history.

(56) References Cited

FOREIGN PATENT DOCUMENTS

| | | |
|---|---|---|
| JP | 2012-068507 | 4/2012 |
| WO | 2008/142086 | 11/2008 |

OTHER PUBLICATIONS

International Preliminary Report on Patentability issued Feb. 23, 2016 in International Application No. PCT/JP2014/069191.

* cited by examiner

ELECTROWETTING DEVICE AND ELECTROWETTING DISPLAY

TECHNICAL FIELD

The present invention relates to electrowetting devices and electrowetting displays.

BACKGROUND ART

Recently, attention has been focused on electrowetting (hereinafter also denoted as "EW") devices using the electrowetting effect. Generally, in an EW device, a cell is filled with a polar liquid and a non-polar liquid which are not miscible with each other. By applying a voltage to the EW device, the interface between the polar liquid and the non-polar liquid changes and thus the light transmittance changes. Therefore, in order to increase the response speed of the EW device, it is necessary to reduce the viscosities of the polar liquid and the non-polar liquid to make them easier to flow upon application of a voltage.

However, when the viscosities of the polar liquid and the non-polar liquid are reduced, a problem of so-called backflow is likely to occur. Backflow herein refers to a phenomenon in which although a voltage continues to be applied to the EW device, the interface between the polar liquid and the non-polar liquid changes to approach an interface shape seen when no voltage is applied thereto.

For example, Patent Literature 1 proposes to prevent backflow by contriving a way to apply a voltage to the EW device.

CITATION LIST

Patent Literature

Patent Literature 1: WO2008/142086

SUMMARY OF INVENTION

Technical Problem

In performing the way to apply a voltage described in Patent Literature 1, there arises the problem that driving the EW device is complicated. Therefore, there is a demand for a novel means for preventing backflow.

A principal object of the present invention is to provide an EW device less likely to cause backflow.

Solution to Problem

An electrowetting device according to the present invention includes a device body, a dielectric layer, an electrode, a non-polar liquid, and a polar liquid. The device body includes a cell. The dielectric layer is disposed in the cell. The dielectric layer has a hydrophobic surface. The electrode is configured to polarize the dielectric layer. The non-polar liquid is disposed on the hydrophobic surface in the cell. The polar liquid is non-miscible with the non-polar liquid. The polar liquid is disposed on the hydrophobic surface in the cell. The non-polar liquid contains a colored material. The polar liquid contains non-ionic molecules. The non-ionic molecule has a polar portion and a non-polar portion.

The non-ionic molecule preferably has an HLB value of 7 or less defined by Griffin's method.

The non-ionic molecule may include an aromatic ring forming at least part of the non-polar portion and linked to the polar portion.

The non-ionic molecule may include an aromatic ring and at least one (—CONH—R) group (where R is an alkyl group whose number of carbon atoms is 3 to 20) linked to the aromatic ring.

The non-ionic molecule may be a compound represented by the following general formula (1):

[Chem. 1]

In the general formula (1), $R_1$, $R_2$, and $R_3$ are each independently an alkyl group whose number of carbon atoms is 3 to 20.

The non-ionic molecule may include a pyranose structure and an aromatic ring linked through an ether linkage to the pyranose structure and the aromatic ring may include at least one substituent other than hydrogen. In this case, the ether linkage preferably forms an acetal structure. The non-ionic molecule may be represented by the following chemical formula (2):

[Chem. 2]

In the chemical formula (2), R is an alkyl group having a carbon number of 1 to 6 and AR is an aromatic ring having at least one substituent other than hydrogen.

In the chemical formula (2), AR is preferably represented by the following chemical formula (3):

[Chem. 3]

In the chemical formula (3), * represents a binding site to the acetal structure, $R_1$ and $R_2$ each represent a monovalent substituent other than hydrogen, n and m each represent an integer from 0 to 3, and n+m is an integer from 1 to 3.

In the chemical formula (3), R1 and R2 are each preferably an alkyl ground having a carbon number of 1 to 6.

The pyranose structure is preferably a mannopyranoside structure.

The non-ionic molecule preferably has a molecular weight of 1500 or less.

The polar liquid may contain an organic solvent.

The polar liquid preferably has a viscosity in a range of 5 mPa·s to 500 mPa·s at 20° C.

The colored material may be a pigment having a polar portion and a non-polar portion.

An electrowetting display according to the present invention includes the above-described electrowetting device.

Advantageous Effects of Invention

The present invention can provide an EW device less likely to cause backflow.

DESCRIPTION OF EMBODIMENTS

Hereinafter, a description will be given of an exemplary preferred embodiment for working of the present invention. However, the following embodiment is simply illustrative. The present invention is not at all limited to the following embodiment.

Throughout the drawings to which the embodiment and the like refer, elements having substantially the same functions will be referred to by the same reference signs. The drawings to which the embodiment and the like refer are schematically illustrated. The dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

Figure 1:
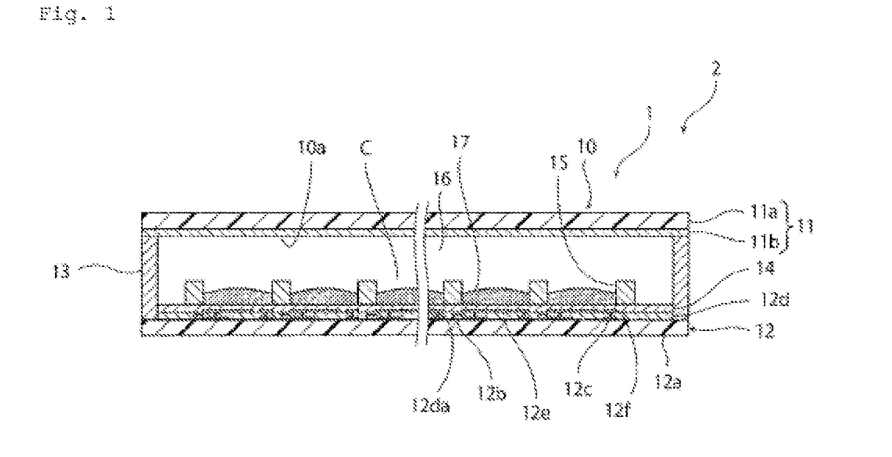
FIG. 1 is a schematic cross-sectional view of an electrowetting display according to one embodiment of the present invention.

FIG. 1 is a schematic cross-sectional view of an electrowetting display (hereinafter also referred to as an "EW display") 2 according to this embodiment.

The EW display 2 includes an electrowetting device (hereinafter also referred to as an "EW device") 1. The EW display 2 may further include, in addition to the EW device 1, a light source, a reflecting member, and so on.

The EW device 1 includes a device body 10. The device body 10 has an internal space 10a.

Specifically, the device body 10 includes a first substrate 11 and a second substrate 12. The first substrate 11 and the second substrate 12 are opposed at a distance from each other with the internal space 10a in between. A sealing member 13 forming a sidewall is disposed between the first substrate 11 and the second substrate 12. The sealing member 13 and the first and second substrates 11, 12 define the internal space 10a.

The first substrate 11 includes a substrate body 11a and a common electrode 11b. The common electrode 11b is disposed on a principal surface of the substrate body 11a facing toward the second substrate 12. On the other hand, the second substrate 12 includes a substrate body 12a, TFTs 12b, a wiring 12c, a planarizing film 12d, pixel electrodes 12e, and common electrodes 12f.

The substrate body 11a and the substrate body 12a can be made of, for example, glass, molded resin or film.

The common electrode 11b is preferably a transparent electrode. The common electrode 11b can be made of, for example, a transparent conducting oxide, such as ITO (tin-doped indium oxide).

The pixel electrodes 12e and the common electrodes 12f are each formed on the planarizing film 12d. Each pixel electrode 12e and each common electrode 12f are connected through their respective via hole electrodes 12da to the TFT 12b and the wiring 12c, respectively.

The pixel electrodes 12e and the common electrodes 12f can be each made of, for example, a transparent conducting oxide, such as indium tin oxide (ITO), or metal, such as aluminum or copper.

The dielectric layer 14 is disposed in the internal space 10a on a surface of the second substrate 12 facing toward the first substrate 11. Specifically, the dielectric layer 14 is disposed on the top of the second substrate 12. The dielectric layer 14 is provided to cover substantially the entire principal surface of the substrate body 12a facing toward the first substrate 11, inclusive of regions where the pixel electrodes 12e and the common electrodes 12f are provided.

The surface of the dielectric layer 14 is subjected to water repellent treatment by a known method, for example, a method including application of fluororesin and heat treatment. Therefore, the surface of the dielectric layer 14 facing toward the first substrate 11 forms a hydrophobic surface. In other words, the dielectric layer 14 has a hydrophobic surface. A voltage can be applied to the dielectric layer 14 through the common electrode 11b and the pixel electrodes 12e. Thus, the dielectric layer 14 is polarized.

A partition wall 15 extending toward the first substrate 11 is provided on the top of the dielectric layer 14 on the second substrate 12. The partition wall 15 may or may not reach the first substrate 11. The partition wall 15 partitions the internal space 10a into a plurality of cells C. Specifically, in this embodiment, the partition wall 15 is provided in a grid form. Thus, a plurality of cells C of approximately rectangular shape are provided in a matrix.

Arranged in each of the plurality of cells C are: a pixel electrode 12e capable of polarizing the dielectric layer 14 together with the common electrode 11b; and a common electrode 12f. The common electrodes 12f are electrodes having the same potential as the common electrode 11b.

Each cell C is filled with a polar liquid 16 and a non-polar liquid 17. The polar liquid 16 and the non-polar liquid 17 are disposed on the hydrophobic surface of the dielectric layer 14 in the internal space 10a. The surface energy of the polar liquid 16 is relatively high, while the surface energy of the non-polar liquid 17 is relatively low. The polar liquid 16 is made of a hydrophilic, high-surface energy liquid. The non-polar liquid is made of a hydrophobic, low-surface energy liquid. Therefore, the polar liquid 16 and the non-polar liquid 17 are substantially non-miscible with each other.

From the viewpoint of increasing the response speed of the EW display 2, the viscosity of each of the polar liquid 16 and the non-polar liquid 17 is preferably low. The viscosity of each of the polar liquid 16 and the non-polar liquid 17 is preferably 800 mPa·s or less, more preferably 500 mPa·s or less, and still more preferably 300 mPa·s or less.

The non-polar liquid 17 can be made of, for example, an organic solvent, such as alkanes, silicones or fluorocarbons. The non-polar liquid 17 may contain a plurality of types of organic solvents. Examples of alkanes include linear alkanes, branched alkanes, and cyclic alkanes. Specific examples of linear or branched alkanes that are preferably used include heptane, octane, nonane, decane, undecane, and dodecane. Specific examples of cyclic alkanes include cyclohexane and cycloheptane. Examples of silicones include octamethyltrisiloxane, decamethyltetrasiloxane, decamethylcyclopentasiloxane, and dodecamethylpentasiloxane.

The polar liquid 16 may be water or an aqueous solution or may contain at least one type of organic solvent. The polar liquid 16 preferably contains an organic solvent. Among polar organic solvents are those having a lower melting point than water or the like. With the use of such a low-melting point organic solvent as the polar liquid 16, the operating temperature range of the EW display 2 can be widened. From the viewpoint of widening the operating temperature range of the EW display 2, the boiling point of the polar liquid 16 is preferably 80° C. or above. In this case, the content of organic solvent in the polar liquid 16 is preferably 90% by mass or more. Specific examples of the organic solvent that are preferably used as the polar liquid 16 include: monovalent and polyvalent alcohols, such as ethanol, propanol, and ethylene glycol; amides, such as dimethylformamide and dimethylacetamide; sulfoxides, such as dimethyl sulfoxide; and pyrrolidones, such as N-methylpyrrolidone. The polar liquid 16 may be a mixed liquid containing an organic solvent and water.

The non-polar liquid 17 contains a colored material. On the other hand, the polar liquid 16 contains substantially no colored material.

The colored material may be, for example, a pigment having a polar portion and a non-polar portion. Specific examples of the pigment having a polar portion and a non-polar portion include carbon black, titanium black, ferrioxide, copper-chromium composite oxide, and copper-chromium-zinc composite oxide.

The colored material may contain a polar dye. Specific examples of the polar dye include solvent blacks. The content of the colored material in the non-polar liquid 17 can be appropriately selected according to optical properties and so on required for the EW display 2. The content of the colored material in the non-polar liquid 17 is normally about 1% to about 30% by weight.

On the other hand, the polar liquid 16 contains non-ionic molecules having a polar portion and a non-polar portion. The HLB value of the non-ionic molecule defined by Griffin's method is preferably 7 or less, more preferably 6 or less, and still more preferably 5 or less. The reason for this is that if the HLB value of the non-ionic molecule defined by Griffin's method is large, the polar liquid 16 and the non-polar liquid 17 become miscible.

The HLB value defined by Griffin's method is 20×(sum of formula weight of hydrophilic portion)/(molecular weight). Therefore, the HLB value defined by Griffin's method takes a value of 0 to 20.

The non-ionic molecule may include an aromatic ring forming at least part of the non-polar portion and linked to the polar portion. The non-ionic molecule may include an aromatic ring and at least one (—CONH—R) group (where R is an alkyl group whose number of carbon atoms is 3 to 20) linked to the aromatic ring.

Specific examples of the non-ionic molecule that is preferably used include compounds represented by the following general formula (1):

[Chem. 4]

In the general formula (1), $R_1$, $R_2$, and $R_3$ are each independently an alkyl group whose number of carbon atoms is 3 to 20.

A compound represented by the general formula (1) can be synthesized, for example, by reacting a benzenetricarboxylic acid or benzenetricarboxylic acid chloride with an appropriate alkyl amine.

The non-ionic molecule may include a pyranose structure and an aromatic ring linked through an ether linkage to the pyranose structure and the aromatic ring may include at least one substituent other than hydrogen. In this case, the pyranose structure is preferably a pyranoside structure and more preferably a mannopyranoside structure. No particular limitation is placed on the type of the pyranose structure and the pyranose structure may be a hexose pyranose ring or may be hemiacetalized to stabilize the pyranose structure.

Typical examples of the pyranose structure include methyl-α-D-glucopyranoside, methyl-β-D-glucopyranoside, methyl-α-D-galactopyranoside, methyl-β-D-galactopyranoside, methyl-α-D-mannopyranoside, and methyl-β-D-mannopyranoside.

The non-ionic molecule is, for example, preferably a molecule represented by the following chemical formula (2):

[Chem. 5]

In the chemical formula (2), R is an alkyl group having a carbon number of 1 to 6 and AR is an aromatic ring having at least one substituent other than hydrogen.

In the chemical formula (2), R is preferably an alkyl group having a carbon number of 1 to 3 and more preferably an alkyl group having a carbon number of 1 or 2. Specifically, R may be a methyl group, an ethyl group, an n-propyl group, an isopropyl group, an n-butyl group, an isobutyl group, a sec-butyl group, a t-butyl group, an n-pentyl group, an n-hexyl group or so on.

AR is preferably represented by the chemical formula (3):

[Chem. 6]

(3)

In the chemical formula (3), * represents a binding site to the acetal structure, $R_1$ and $R_2$ each represent a monovalent substituent other than hydrogen, n and m each represent an integer from 0 to 3, and n+m is an integer from 1 to 3.

In the chemical formula (3), $R_1$ and $R_2$ are each preferably an alkyl ground having a carbon number of 1 to 10, more preferably an alkyl group having a carbon number of 1 to 6, and still more preferably an alkyl group having a carbon number of 1 to 4. $R_1$ and $R_2$ each may be a linear alkyl group or a branched alkyl group. Specifically, $R_1$ and $R_2$ each may be a methyl group, an ethyl group, an n-propyl group, an isopropyl group, an n-butyl group, an isobutyl group, a sec-butyl group, a t-butyl group, an n-pentyl group, an n-hexyl group or so on.

Preferred specific examples of AR include monosubstituted phenyl groups, such as a tolyl group, an ethylphenyl group, an isopropylphenyl group, an n-propylphenyl group, an n-butylphenyl group, an isobutylphenyl group, and a tert-butylphenyl group, and disubstituted phenyl groups, such as a xylyl group.

$R_1$ and $R_2$ each may be a substituent having carbon via an ether linkage or the like or a substituent containing no carbon. $R_1$ and $R_2$ each may be, for example, a methoxy group or a halogen atom. Therefore, AR may be, for example, a methoxyphenyl group, a nitrophenyl group or a chlorophenyl group.

By adding an aromatic aldehyde to a pyranose structure, a compound represented by the chemical formula (2) can be synthesized. Aromatic aldehydes include: benzaldehydes, such as benzaldehyde, tolualdehyde, ethylbenzaldehyde, propylaldehyde, cuminaldehyde, n-butylaldehyde, isobutylaldehyde, tert-butylaldehyde, dimethylbenzaldehyde, trimethylbenzaldehyde, and anisaldehyde; and naphthaldehydes, such as 1-naphthaldehyde.

The molecular weight of the non-ionic molecule is preferably 1500 or less, more preferably 1200 to 200, and still more preferably 1000 to 300. If the molecular weight of the non-ionic molecule is too large, the non-ionic molecule becomes less soluble in the polar liquid 16. If the molecular weight of the non-ionic molecule is too small, the non-ionic molecule may increase its crystallinity to precipitate crystals of the non-ionic molecules.

No particular limitation is placed on the content of the non-ionic molecules in the polar liquid 16 but it is, for example, preferably 0.001% to 10% by mass, more preferably 0.01% to 5% by mass, still more preferably 0.05% to 1% by mass.

In the EW device 1, the surface of the dielectric layer 14 forms a hydrophobic surface. Therefore, in a state where no voltage is applied between the common electrode 11b and the pixel electrodes 12e, the non-polar liquid 17 has a higher affinity for the dielectric layer 14 than the polar liquid 16. Hence, in the state where no voltage is applied between the common electrode 11b and the pixel electrodes 12e, substantially the entire dielectric layer 14 is covered with the non-polar liquid 17.

Figure 2:
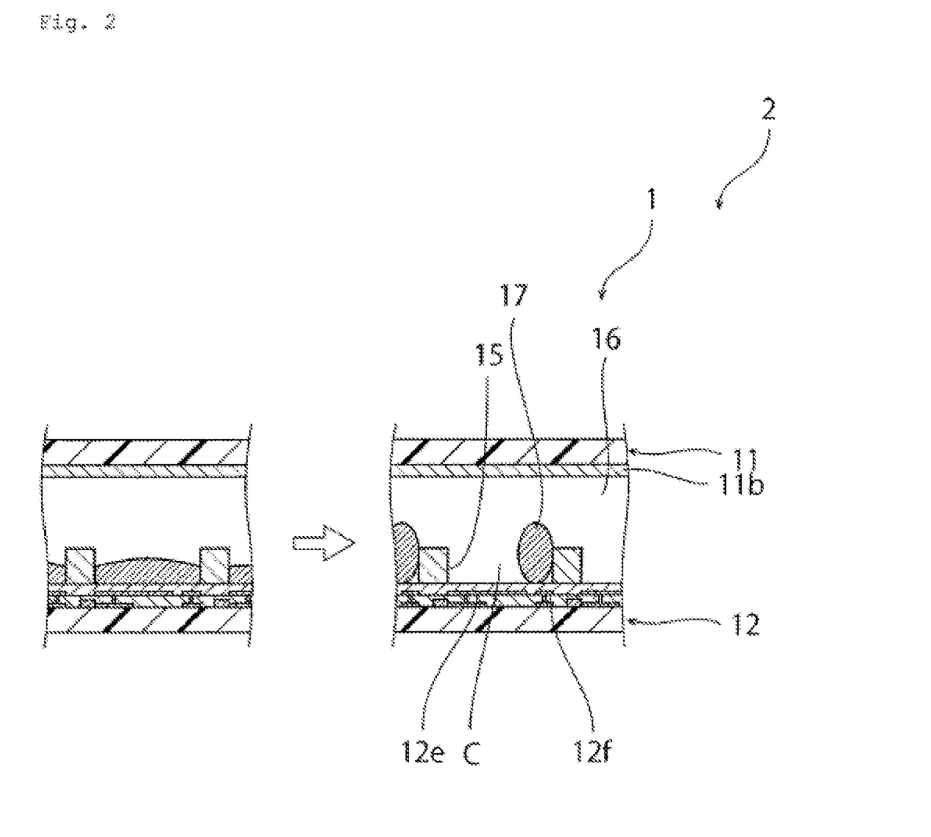
FIG. 2 is a schematic cross-sectional view for illustrating a behavior of the electrowetting display according to the one embodiment of the present invention.

As shown in FIG. 2, when a voltage (EV) is applied to a pixel electrode 12e to provide a potential difference between the pixel electrode 12e and the common electrode 11b, the pixel electrode 12e and the polar liquid 16 function as electrodes to polarize a portion of the dielectric layer 14 located over the pixel electrode 12e. As a result, the polar liquid 16 is attracted, by an electrostatic action, to the portion of the dielectric layer 14 located over the pixel electrode 12e. On the other hand, no potential difference is created between the common electrode 12f and the common electrode 11b. Therefore, a portion of the dielectric layer 14 located over the common electrode 12f is not polarized and the surface thereof remains a hydrophobic surface. Thus, the non-polar liquid 17 having covered the portion of the dielectric layer 14 located over the pixel electrode 12e is pushed away onto the portion of the dielectric layer 14 located over the common electrode 11b. Accordingly, the coverage per unit area of the non-polar liquid 17 decreases. As a result, the light transmittance of the cell C changes. In the EW device 1, image display is performed using this principle.

So long as a voltage continues to be applied to the pixel electrode, the portion of the dielectric layer located over the pixel electrode is kept polarized. Therefore, normally, it can be assumed that a certain state of the interface between the polar liquid and the non-polar liquid is maintained. Actually, however, backflow occurs in which although a voltage continues to be applied, the interface between the polar liquid and the non-polar liquid changes to approach an interface shape seen when no voltage is applied.

This backflow can be prevented by increasing the viscosities of the polar liquid and the non-polar liquid to reduce the fluidity of the polar liquid and the non-polar liquid. However, when the viscosities of the polar liquid and the non-polar liquid are increased, the response speed of the EW display decreases.

In the EW display 2, the polar liquid 16 contains non-ionic molecules having a polar portion and a non-polar portion. Therefore, backflow can be prevented without much increasing the viscosities of the polar liquid and the non-polar liquid.

Figure 3:
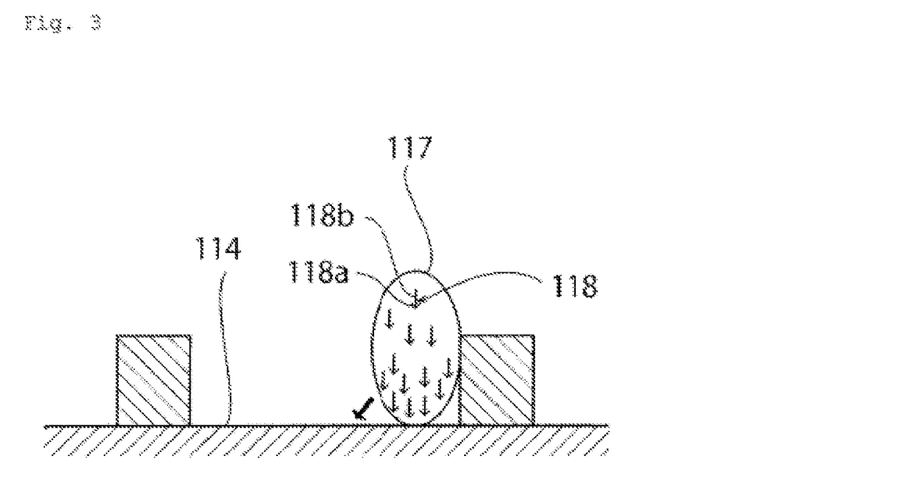
FIG. 3 is a schematic cross-sectional view for illustrating backflow in a conventional electrowetting display.

The reason for the above is not clear but can be considered as follows. Backflow can be considered to result from the orientation of a color material, such as a pigment or a dye, in a voltage applied state. Specifically, as shown in FIG. 3, the color material 118 contained in the non-polar liquid 117 is oriented into a state where, among polar portions 118a and non-polar portions 118b of the color material 118, the polar portions 118a face toward the dielectric layer 114. Therefore, the hydrophilicity of the surface of the non-polar liquid 117 facing toward the dielectric layer 114 is increased. It can be considered that, thus, the non-polar liquid 117 moves toward wetting across the dielectric layer 114, so that backflow occurs. For example, when carbon black is used as a pigment, carbon black normally does not exist as primary particles but exists as secondary particles. Because the secondary particles of carbon black are not spherical, they have an orientation. Therefore, even when carbon black having no orientation as primary particles is used as a pigment, the above problem of orientation can occur.

Figure 4:
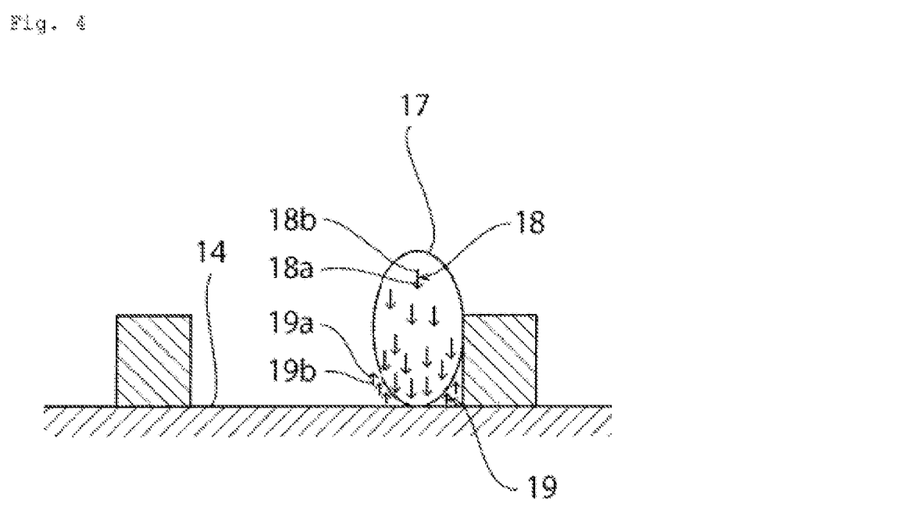
FIG. 4 is a schematic cross-sectional view for illustrating an inferential principle of difficulty of occurrence of backflow in the electrowetting display according to the one embodiment of the present invention.

Also in the EW display 2, as shown in FIG. 4, it can be considered that a color material 18 contained in the non-polar liquid 17 is oriented into a state where, among polar portions 18a and non-polar portions 18b of the color material 18, the polar portions 18a face toward the dielectric layer 14. When the color material 18 is oriented, the non-ionic molecules 19 contained in the polar liquid 16 are accordingly oriented into a state where the polar portions 19a face toward the non-polar liquid 17 and the non-polar portions 19b face toward the dielectric layer 14. This prevents that the orientation of the color material 18 causes the non-polar liquid 17 to wet across the dielectric layer 14. Therefore, it can be considered that backflow can be prevented.

If the viscosities of the non-polar liquid 17 and the polar liquid 16 are too low, backflow may be likely to occur even when the non-ionic molecules are contained in the polar liquid 16. Therefore, the viscosity of at least one of the polar liquid 16 and the non-polar liquid 17 is preferably not less than 5 mPa·s, more preferably not less than 8 mPa·s, and still more preferably not less than 10 mPa·s.

The present invention will be described below in further detail with reference to specific examples, but the present invention is not at all limited by the following examples, and modifications and variations may be appropriately made therein without changing the gist of the invention.

In the following examples and comparative examples, reagents manufactured by Wako Pure Chemical Industries, Ltd. were used as solvents or reagents without any further purification, unless otherwise stated.

Example 1

Synthesis of Non-Ionic Molecules

An amount of 20 mL of chloroform solution of 1.5 g of octylamine was put into a flask. Furthermore, 100 mL of an aqueous solution containing 7.0 g of sodium hydrogen carbonate dissolved therein was added to the flask. Next, the flask was stirred for ten minutes while being cooled in an ice-water bath. Next, 10 mL of a chloroform solution of 1.1 g of 1,3,5-benzenetricarbonyl chloride was prepared. This solution was put into a dropping funnel and slowly added dropwise to the flask. After the dropwise addition, the flask continued to be stirred for four hours while being cooled in an ice-water bath, followed by stirring at room temperature for one night. An organic phase was separated from the resultant two-phase reaction liquid. The organic phase was washed with 0.1 N hydrochloric acid, then washed with an aqueous solution of 5% sodium hydrogen carbonate, then washed with water, and then dried with anhydrous sodium sulfate and chloroform was then removed under reduced pressure. As a result, 2.1 g of white solid (1,3,5-benzenetricarbonyl octylamide) was obtained. It was confirmed by H-NMR that this white solid was 1,3,5-benzenetricarbonyl octylamide. The HLB value of the molecule of this solid calculated by Griffin's method is 4.8.

<Preparation of Polar Liquid>

A polar liquid was obtained by dissolving 0.5% by mass 1,3,5-benzenetricarbonyl octylamide in a mixed solution of 95% ethyl alcohol and 5% water.

<Preparation of Non-Polar Liquid>

A non-polar liquid was prepared by dispersing 5% by mass carbon black of 13 nm particle size having a hydrophobic surface into octane with a homogenizer.

<Production of EW Device>

An EW device having substantially the same structure as the above-described EW device 1 was produced using the above polar liquid and the above non-polar liquid.

Comparative Example 1

An EW device was produced in the same manner as in Example except that the polar liquid contained no 1,3,5-benzenetricarbonyl octylamide.

(Evaluation)

A pulse voltage of 0 V/10 V at 1 Hz was applied to pixel electrodes of the EW devices produced in Example 1 and Comparative Example 1. No backflow was confirmed in the EW device produced in Example 1 even when the voltage continued to be applied thereto. In contrast, when the voltage continued to be applied to the EW device produced in Comparative Example 1, the aperture ratio gradually decreased and, therefore, backflow was confirmed.

Example 2

Synthesis of Non-Ionic Molecules

An amount of 10 mL of benzaldehyde was added to 4.5 g of methyl-α-D-galactopyranoside monohydrate (manufactured by Wako Pure Chemical Industries, Ltd.), followed by further addition of 3.2 g of zinc chloride (manufactured by Wako Pure Chemical Industries, Ltd.). The resultant reaction mixture was stirred at room temperature for an hour, then stirred at 40° C. for two hours, then stirred at 50° C. for two hours, and further stirred at 60° C. for two hours.

This solution was cooled to room temperature, followed by addition of 100 mL of water and stirring. Resultant precipitated solid was collected by filtration, washed three times with water, and then dried under vacuum. An amount of 1.5 g of white solid was obtained.

When this solid was measured with NMR (ECX-400 manufactured by JEOL Ltd.), a spectrum that can be consistently considered as methyl-4,4-O-benzylidene-α-D-galactopyranoside was obtained. The HLB value of the molecule of this solid calculated by Griffin's method is 2.3.

The preparation of a polar liquid, the preparation of a non-polar liquid, and the production of an EW device were performed in the same manner as in Example 1.

Comparative Example 2

An EW device was produced in the same manner as in the above Examples except that 0.5% by mass sodium dodecylbenzenesulfonate having ionicity was added to the polar liquid.

(Evaluation 2)

A voltage of 10 V continued to be applied for 10 seconds to the pixel electrodes of the EW devices produced in Example 2 and Comparative Example 2.

No backflow was observed in the EW device produced in Example 2 even when the voltage continued to be applied thereto.

In contrast, when the voltage continued to be applied to the EW device produced in Comparative Example 2, the aperture ratio gradually decreased and the aperture ratio after 10 seconds was 30% of the initial aperture ratio. That is, backflow was observed.

REFERENCE SIGNS LIST

1: electrowetting (EW) device
2: electrowetting display (EWD)
10: device body
10a: internal space
11: first substrate 11a: substrate body
11b: common electrode
12: second substrate
12a: substrate body
12b: TFT
12c: wiring
12d: planarizing film
12da: via hole electrode
12e: pixel electrode
12f: common electrode
13: sealing member
14: dielectric layer
15: partition wall
16: polar liquid
17: non-polar liquid
18: pigment
18a: polar portion
18b: non-polar portion
19: non-ionic molecule
19a: polar portion
19b: non-polar portion
20: particle

The invention claimed is:

1. An electrowetting device, comprising:
a device body including a cell;
a dielectric layer disposed in the cell and having a hydrophobic surface;
an electrode configured to polarize the dielectric layer; and
a non-polar liquid disposed on the hydrophobic surface in the cell and a polar liquid non-miscible with the non-polar liquid,
wherein
the non-polar liquid contains a colored material, and
the polar liquid contains non-ionic molecules having a polar portion and a non-polar portion,
wherein the non-ionic molecules are molecules having an aromatic ring forming at least part of the non-polar portion, the aromatic ring being linked to the polar portion, and
wherein at least one (—CONH—R) group is linked to the aromatic ring, where R is an alkyl group whose number of carbon atoms is 3 to 20.

2. The electrowetting device according to claim 1, wherein the non-ionic molecules have an HLB value of 7 or less defined by Griffin's method.

3. The electrowetting device according to claim 1, wherein the non-ionic molecules are compounds represented by the following general formula (1):

[Chem. 1]

(1)

where in the general formula (1), $R_1$, $R_2$, and $R_3$ are each independently an alkyl group whose number of carbon atoms is 3 to 20.

4. The electrowetting device according to claim 1, wherein the non-ionic molecules have a molecular weight of 1500 or less.

5. The electrowetting device according to claim 1, wherein the polar liquid contains an organic solvent.

6. The electrowetting device according to claim 1, wherein the polar liquid has a viscosity in a range of 5 mPa·s to 500 mPa·s at 20° C.

7. The electrowetting device according to claim 1, wherein the colored material is a pigment having a polar portion and a non-polar portion.

8. An electrowetting display comprising the electrowetting device according to claim 1.

9. An electrowetting device, comprising:
a device body including a cell;
a dielectric layer disposed in the cell and having a hydrophobic surface;
an electrode configured to polarize the dielectric layer; and
a non-polar liquid disposed on the hydrophobic surface in the cell and a polar liquid non-miscible with the non-polar liquid,
wherein
the non-polar liquid contains a colored material, and
the polar liquid contains non-ionic molecules having a polar portion and a non-polar portion, and
wherein the non-ionic molecules include a pyranose structure and an aromatic ring linked through an ether linkage to the pyranose structure, and the aromatic ring includes at least one substituent other than hydrogen.

10. The electrowetting device according to claim 9, wherein the ether linkage forms an acetal structure.

11. The electrowetting device according to claim 9, wherein the non-ionic molecules are represented by the following chemical formula (2):

[Chem. 2]

(2)

where in the chemical formula (2) R is an alkyl group having a carbon number of 1 to 6 and AR is an aromatic ring having at least one substituent other than hydrogen.

12. The electrowetting device according to claim 11, wherein in the chemical formula (2) AR is represented by the following chemical formula (3):

[Chem. 3]

(3)

where in the chemical formula (3) * represents a binding site to the acetal structure, $R_1$ and $R_2$ each represent a monovalent substituent other than hydrogen, n and m each represent an integer from 0 to 3, and n+m is an integer from 1 to 3.

13. The electrowetting device according to claim 12, wherein in the chemical formula (3) $R_1$ and $R_2$ are each an alkyl ground having a carbon number of 1 to 6.

14. The electrowetting device according to claim 9, wherein the pyranose structure is a mannopyranoside structure.

15. An electrowetting display comprising the electrowetting device according to claim 9.

\* \* \* \* \*